US012736165B2

(12) United States Patent
Vranish

(10) Patent No.: US 12,736,165 B2
(45) **Date of Patent: *Sep. 15, 2026**

(54) LOW-SPILL COUPLING ASSEMBLY

(71) Applicant: Colder Products Company, Roseville, MN (US)

(72) Inventor: David J. Vranish, Mound, MN (US)

(73) Assignee: Colder Products Company, Roseville, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 19/457,543

(22) Filed: Jan. 23, 2026

(65) Prior Publication Data

US 2026/0201998 A1 Jul. 16, 2026

Related U.S. Application Data

(63) Continuation of application No. 19/456,835, filed on Jan. 22, 2026, now Pat. No. 12,674,535, which is a continuation of application No. 19/298,508, filed on Aug. 13, 2025, now Pat. No. 12,590,662, which is a continuation of application No. 19/295,097, filed on Aug. 8, 2025, now Pat. No. 12,601,437, which is a continuation of application No. 18/999,210, filed on Dec. 23, 2024, now Pat. No. 12,486,936, which is a continuation of application No. 18/768,597, filed on Jul. 10, 2024, now Pat. No. 12,455,031, which is a (Continued)

(51) Int. Cl.

| | |
|---|---|
| ***F16L 37/413*** | (2006.01) |
| ***F16L 27/073*** | (2006.01) |
| ***F16L 37/086*** | (2006.01) |
| ***F16L 37/34*** | (2006.01) |
| ***F16L 37/35*** | (2006.01) |

(52) U.S. Cl.

CPC .......... *F16L 37/413* (2013.01); *F16L 27/073* (2013.01); *F16L 37/086* (2013.01); *F16L 37/34* (2013.01); *F16L 37/35* (2013.01); *Y10T 137/87957* (2015.04)

(58) Field of Classification Search

CPC ..... Y10T 137/87941; Y10T 137/87965; Y10T 137/87957; Y10T 137/87949; F16L 37/35; F16L 37/0841; F16L 37/30; F16L 37/32; F16L 37/34; F16L 37/36; F16L 37/413; F16L 37/086; F16L 29/04; F16L 27/073

See application file for complete search history.

(56) References Cited

U.S. PATENT DOCUMENTS

| | | | |
|---|---|---|---|
| 2,854,259 | A | 9/1958 | Clark |
| 3,334,659 | A | 8/1967 | Magorien |

(Continued)

FOREIGN PATENT DOCUMENTS

| | | |
|---|---|---|
| JP | D1734638 | 1/2023 |

OTHER PUBLICATIONS

International Search Report and Written Opinion for PCT/US2014/027937 mailed Jul. 8, 2014.

(Continued)

*Primary Examiner* — Craig M Schneider
*Assistant Examiner* — Andrew J Rost
(74) *Attorney, Agent, or Firm* — Fish & Richardson P.C.

(57) ABSTRACT

The present disclosure relates to a low-spill coupling assembly including a female coupling device and a male coupling device.

29 Claims, 17 Drawing Sheets

Related U.S. Application Data continuation of application No. 18/767,066, filed on Jul. 9, 2024, now Pat. No. 12,455,030, which is a continuation of application No. 18/765,777, filed on Jul. 8, 2024, now Pat. No. 12,129,952, which is a continuation of application No. 18/761,002, filed on Jul. 1, 2024, now Pat. No. 12,123,531, which is a continuation of application No. 18/427,004, filed on Jan. 30, 2024, now Pat. No. 12,025,256, which is a continuation of application No. 18/532,514, filed on Dec. 7, 2023, now Pat. No. 12,359,759, which is a continuation of application No. 17/362,288, filed on Jun. 29, 2021, now Pat. No. 11,885,451, which is a continuation of application No. 16/670,294, filed on Oct. 31, 2019, now Pat. No. 11,079,052, which is a continuation of application No. 16/668,537, filed on Oct. 30, 2019, now Pat. No. 11,060,650, which is a continuation of application No. 14/567,254, filed on Dec. 11, 2014, now Pat. No. 11,067,210, which is a continuation-in-part of application No. 14/212,322, filed on Mar. 14, 2014, now abandoned.

(60) Provisional application No. 61/799,612, filed on Mar. 15, 2013.

(56) References Cited

U.S. PATENT DOCUMENTS 3,918,492 A 11/1975 Karcher
4,079,966 A 3/1978 Berry et al.
4,327,770 A 5/1982 Brown et al.
4,340,052 A 7/1982 Dennehey et al.
4,447,040 A 5/1984 Magorian
4,541,457 A 9/1985 Blenkush
D298,605 S 11/1988 Colgan et al.
4,875,711 A 10/1989 Watanabe
4,892,117 A 1/1990 Spalink
4,919,457 A 4/1990 Moretti
4,936,345 A 6/1990 Nix
D309,774 S 8/1990 Lewis
D313,067 S 12/1990 Kotake et al.
4,991,627 A 2/1991 Nix
5,018,352 A 5/1991 Compton
5,104,158 A 4/1992 Meyer et al.
5,113,657 A 5/1992 Compton et al.
5,139,049 A 8/1992 Jensen et al.
5,215,122 A 6/1993 Rogers et al.
5,292,157 A 3/1994 Rubichon
5,316,041 A 5/1994 Ramacier, Jr. et al.
5,337,782 A 8/1994 Wilcox
5,339,862 A 8/1994 Haunhorst
5,482,083 A 1/1996 Jenski
5,494,073 A 2/1996 Saito
5,494,074 A 2/1996 Ramacier et al.
5,546,985 A 8/1996 Bartholomew
5,703,243 A 12/1997 Nishitani et al.
5,709,243 A 1/1998 Wells et al.
D396,730 S 8/1998 Schaupp
5,791,366 A * 8/1998 Lo ...................... F16L 55/1007 137/614.04
5,911,403 A 6/1999 deCler et al.
5,938,244 A 8/1999 Meyer
5,975,489 A 11/1999 deCler et al.
D419,860 S 2/2000 Persson
6,024,124 A 2/2000 Braun et al.
6,082,399 A 7/2000 Nyberg
6,082,401 A 7/2000 Braun et al.
6,095,190 A 8/2000 Wilcox et al.
6,116,277 A 9/2000 Wilcox et al.
6,176,263 B1 1/2001 Lacroix et al.
6,283,151 B1 9/2001 Countryman et al.
6,328,348 B1 12/2001 Cornford et al.
6,386,596 B1 5/2002 Olson
D468,016 S 12/2002 Mosler et al.
6,517,121 B1 2/2003 Cresswell
6,681,803 B2 1/2004 Taneya et al.
6,685,230 B1 2/2004 Bottura
D494,256 S 8/2004 Nortier
6,802,399 B2 10/2004 Niebling et al.
7,044,161 B2 5/2006 Tiberghien
7,063,357 B1 6/2006 Bay
7,185,674 B2 3/2007 Taylor
7,213,845 B2 5/2007 Sato
7,434,842 B2 10/2008 Schmidt
7,434,844 B2 10/2008 Kao
7,469,472 B2 12/2008 deCler et al.
7,547,047 B2 6/2009 deCler et al.
7,568,737 B2 8/2009 Wells et al.
D602,128 S 10/2009 Williams
D608,424 S 1/2010 Katsuta et al.
D610,760 S 2/2010 Zugen et al.
7,708,029 B2 5/2010 Kitagawa et al.
7,828,336 B2 11/2010 Gammons
7,980,599 B2 7/2011 Schindel
8,028,718 B2 10/2011 Tiberghien
D648,008 S 11/2011 Percoco et al.
D654,573 S 2/2012 Lombardi et al.
8,201,853 B2 6/2012 Tiberghien et al.
D679,784 S 4/2013 Meyer
D687,528 S 8/2013 Meyer
8,590,860 B2 11/2013 Kitagawa
8,764,068 B2 7/2014 Frick et al.
8,870,235 B2 10/2014 Turk
8,899,284 B2 12/2014 Hemingway
8,910,980 B2 12/2014 Neal et al.
D730,495 S 5/2015 Umehara
9,157,560 B2 10/2015 Rehder et al.
D752,721 S 3/2016 Wildfang et al.
D758,555 S 6/2016 Van Dyke et al.
D761,395 S 7/2016 Plackner et al.
D788,890 S 6/2017 Downs et al.
9,689,516 B2 6/2017 Frick et al.
D816,191 S 4/2018 Cove
D816,211 S 4/2018 Guala
D830,523 S 10/2018 Vranish
D830,524 S 10/2018 Vranish
D838,350 S 1/2019 Downs et al.
D879,250 S 3/2020 Vranish
D898,878 S 10/2020 Sprenger
D912,202 S 3/2021 Takezawa
D953,495 S 5/2022 Banks
D1,010,776 S 1/2024 Ingram
D1,016,251 S 2/2024 Castriotta
D1,020,986 S 4/2024 Del Piero
D1,031,948 S 6/2024 Clevenger
D1,043,924 S 9/2024 Sprenger
D1,068,039 S 3/2025 Gao
D1,088,195 S 8/2025 Vranish
12,590,662 B2 * 3/2026 Vranish ................. F16L 27/073
2005/0001425 A1 1/2005 deClear et al.
2007/0029796 A1 2/2007 Bibby
2007/0035129 A1 2/2007 Chappaz
2007/0120361 A1 5/2007 Kao
2009/0167018 A1 7/2009 Lien
2010/0019487 A1 1/2010 deCler et al.
2010/0051129 A1 3/2010 Kitagawa
2011/0067225 A1 3/2011 Bassaco
2013/0092271 A1 4/2013 Downs et al.
2014/0060675 A1 3/2014 Wilhelm et al.
2014/0261819 A1 9/2014 Vranish
2015/0090915 A1 4/2015 Vranish
2015/0267851 A1 9/2015 Aoki
2025/0065668 A1 2/2025 Raves

OTHER PUBLICATIONS

International Preliminary Report on Patentability in Application No. PCT/US2014/027397, dated Sep. 15, 2015, 6 pages.

* cited by examiner 100
118
110
112
114

LOW-SPILL COUPLING ASSEMBLY

CROSS-REFERENCE TO RELATED APPLICATIONS

This is a continuation of and claims priority to U.S. patent application Ser. No. 19/456,835 filed Jan. 22, 2026, which is a continuation of and claims priority to U.S. patent application Ser. No. 19/298,508 filed Aug. 13, 2025, which is a continuation of and claims priority to U.S. patent application Ser. No. 19/295,097 filed Aug. 8, 2025, which is a continuation of and claims priority to U.S. patent application Ser. No. 18/999,210 filed Dec. 23, 2024 (now U.S. Pat. No. 12,486,936), which is a continuation of and claims priority to U.S. patent application Ser. No. 18/768,597 filed Jul. 10, 2024 (now U.S. Pat. No. 12,455,031), which is a continuation of and claims priority to U.S. patent application Ser. No. 18/767,066 filed Jul. 9, 2024 (now U.S. Pat. No. 12,455,030), which is a continuation of U.S. patent application Ser. No. 18/765,777 filed on Jul. 8, 2024 (now U.S. Pat. No. 12,129,952), which is a continuation of U.S. patent application Ser. No. 18/761,002 filed on Jul. 1, 2024 (now U.S. Pat. No. 12,123,531), which is a continuation of U.S. patent application Ser. No. 18/427,004 filed on Jan. 30, 2024 (now U.S. Pat. No. 12,025,256), which is a continuation of and claims priority to U.S. patent application Ser. No. 18/532,514 filed on Dec. 7, 2023 (now U.S. Pat. No. 12,359,759), which is a continuation of and claims priority to U.S. patent application Ser. No. 17/362,288 filed on Jun. 29, 2021 (now U.S. Pat. No. 11,885,451), which is a continuation of and claims priority to U.S. patent application Ser. No. 16/670,294 filed on Oct. 31, 2019 (now U.S. Pat. No. 11,079,052), which is a continuation of and claims priority to U.S. patent application Ser. No. 16/668,537 filed on Oct. 30, 2019 (now U.S. Pat. No. 11,060,650), which is a continuation of and claims priority to U.S. patent application Ser. No. 14/567,254 filed on Dec. 11, 2014 (now U.S. Pat. No. 11,067,210), which is a continuation-in-part of U.S. patent application Ser. No. 14/212,322 filed on Mar. 14, 2014, which is a nonprovisional of and claims priority to U.S. Patent Application No. 61/799,612 filed on Mar. 15, 2013, the disclosures of all of which are expressly incorporated herein by reference in their entirety.

BACKGROUND

Coupling assemblies typically include female and male couplings that are connected to create a fluid flow path therebetween. Such coupling assemblies can be used in various applications, including biomedical applications, beverage dispensing, instrument connections, photochemical handling, liquid cooling of electronics, ink handling, and others.

SUMMARY

In one aspect, a coupling system includes: a female coupling device, the female coupling device including a first main body with a first front face, the first front face defining a first opening leading into a first fluid passageway; a stem having a stem head positioned within a sleeve; a first spring positioned about the stem that biases the sleeve into a closed position; a first seal that seals between the main body and the sleeve; a second seal that seals between the sleeve and the stem head; and a third seal that is positioned at the opening of the main body. The coupling system includes: a male coupling device, the male coupling device including a second main body with a second front face, the second front face defining a second opening leading into a second fluid passageway; a valve member and a second spring positioned within the second fluid passageway; and a major seal that seals between the second main body and the valve member. The second main body of the male coupling device is capable of being inserted into the first opening of the first main body of the female coupling device so that the first seal and the third seal of the female coupling device engage the second main body of the male coupling device. The sleeve and the valve member are displaced against the first and second springs such that the second seal and the major seal are disengaged so that fluid flows through the first and second fluid passageways.

In another aspect, a female coupling device includes: a main body having a front face, the front face defining an opening leading into a fluid passageway; a stem having a stem head positioned within a sleeve; a spring positioned about the stem that biases the sleeve into a closed position; a first seal that seals between the main body and the sleeve; a second seal that seals between the sleeve and the stem head; and a third seal that is positioned at the opening of the main body to seal against a mating male coupling device. The male coupling device is capable of being inserted into the opening of the main body of the female coupling device.

In a further aspect, a female coupling device includes: a main body having a front face, the front face defining an opening leading into a fluid passageway; a stem having a stem head positioned within a sleeve; a spring positioned about the stem that biases the sleeve into a closed position; a first seal that seals between the main body and the sleeve; a second seal that seals between the sleeve and the stem head; a third seal that is positioned at the opening of the main body to seal against a mating male coupling device; and a clip member slidably mounted on the female coupling device, the clip member slidable between a connecting position wherein the clip member engages the mating male coupling device and a disconnecting position wherein the clip member is disengaged from the mating male coupling device.

A further aspect still relates to a coupling system including: a female coupling device, the female coupling device including: a first main body with a first front face, the first front face defining a first opening leading into a first fluid passageway; a stem having a stem head positioned within a sleeve; a first spring positioned about the stem that biases the sleeve into a closed position; a first seal that seals between the main body and the sleeve; a second seal that seals between the sleeve and the stem head; a third seal that is positioned at the opening of the main body; and a clip member slidably mounted on the female coupling device. The coupling system includes a male coupling device, the male coupling device including: a second main body with a second front face, the second front face defining a second opening leading into a second fluid passageway; a valve member and a second spring positioned within the second fluid passageway; and a major seal that seals between the second main body and the valve member. The clip member is slidable between a connecting position where the clip member engages the male coupling device and a disconnecting position where the clip member is disengaged from the male coupling device. The second main body of the male coupling device is capable of being inserted into the first opening of the first main body of the female coupling device so that the first seal and the third seal of the female coupling device engage the second main body of the male coupling device. The sleeve and the valve member are displaced against the first and second springs such that the second seal and the major seal are disengaged so that fluid flows through the first and second fluid passageways.

DESCRIPTION OF THE DRAWINGS

Reference is now made to the accompanying drawings, which are not necessarily drawn to scale.

FIG. 24 is a cross-sectional view of the female and male coupling devices of FIG. 23.

DETAILED DESCRIPTION

Figure 1:
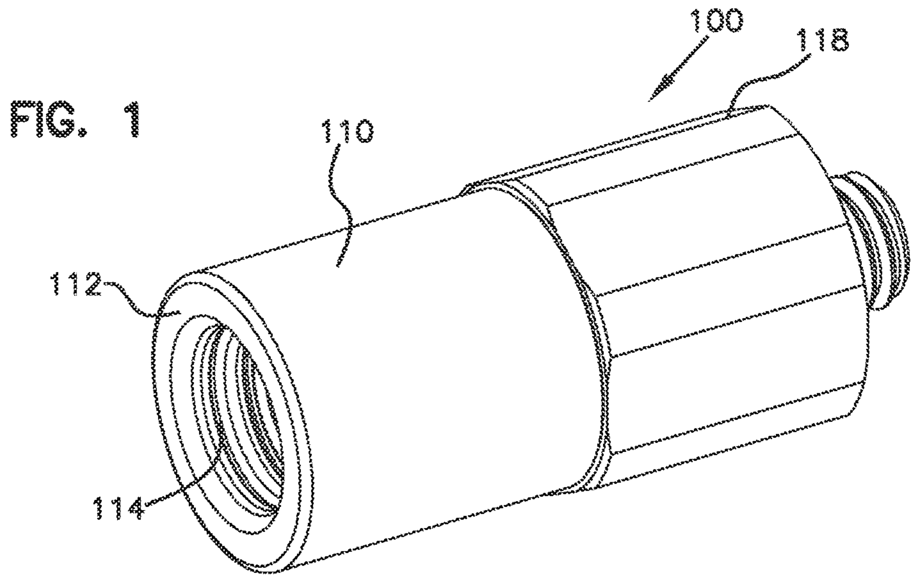
FIG. 1 is a perspective of an example female coupling device.
Figure 2:
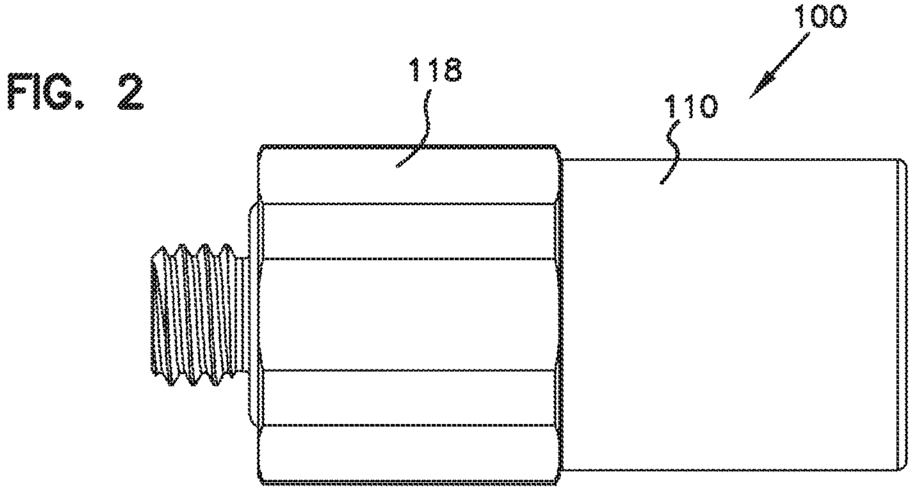
FIG. 2 is a side view of the female coupling device of FIG. 1.
Figure 3:
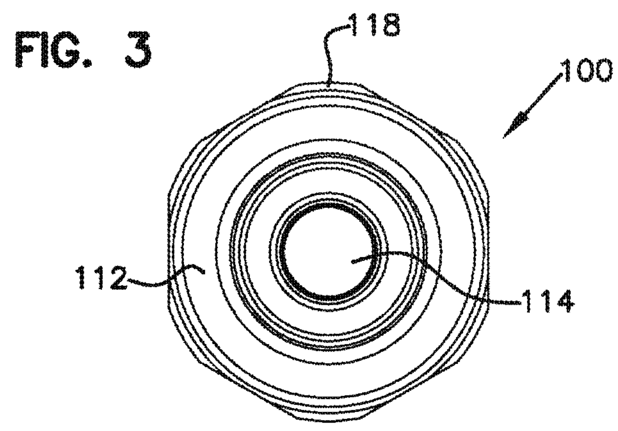
FIG. 3 is an end view of the female coupling device of FIG. 1.
Figure 4:
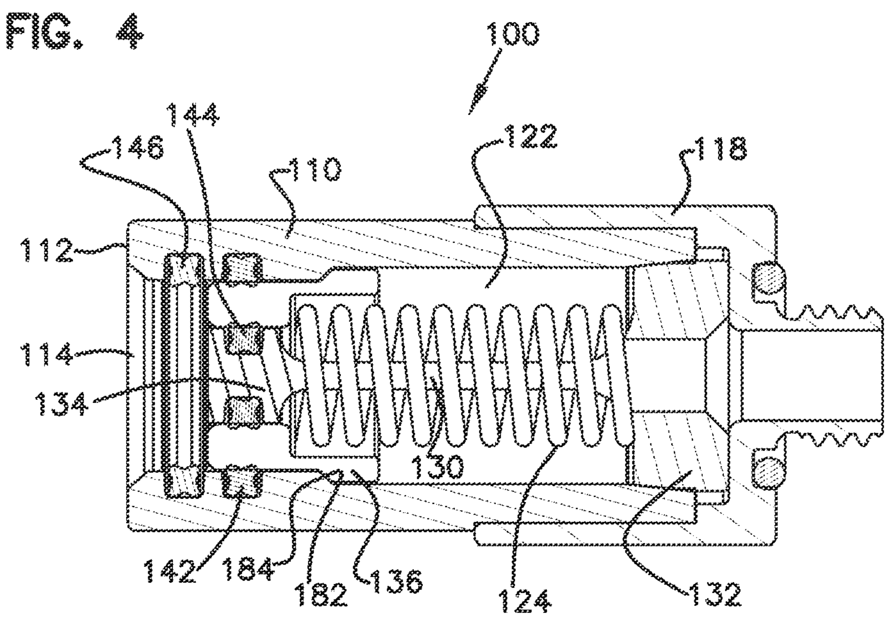
FIG. 4 is a cross-sectional view of the female coupling device of FIG. 1.
Figure 8:
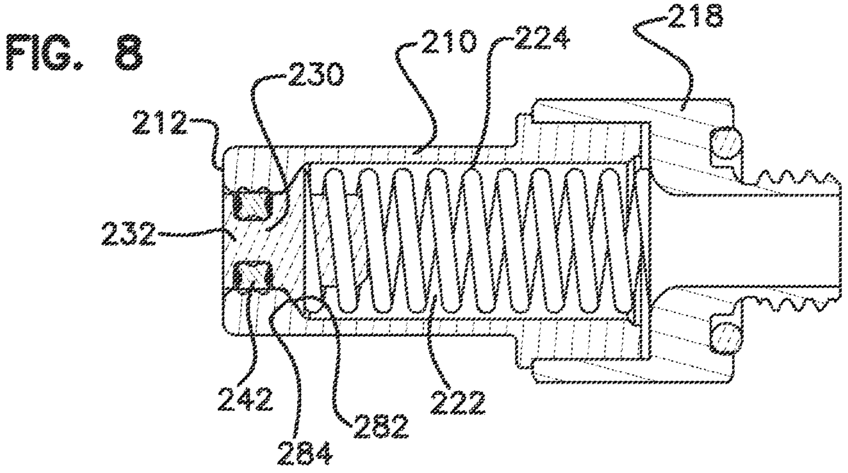
FIG. 8 is a cross-sectional view of the male coupling device of FIG. 5.
Figure 5:
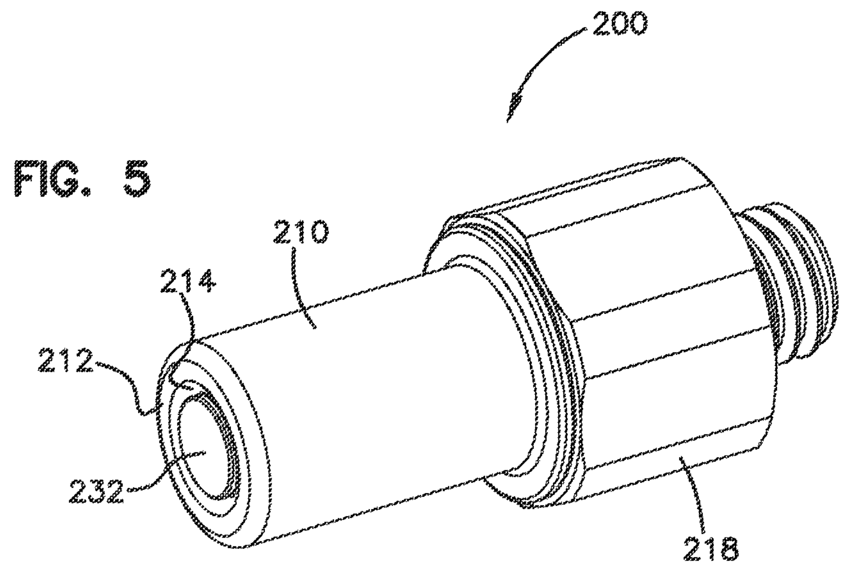
FIG. 5 is a perspective of an example male coupling device.
Figure 6:
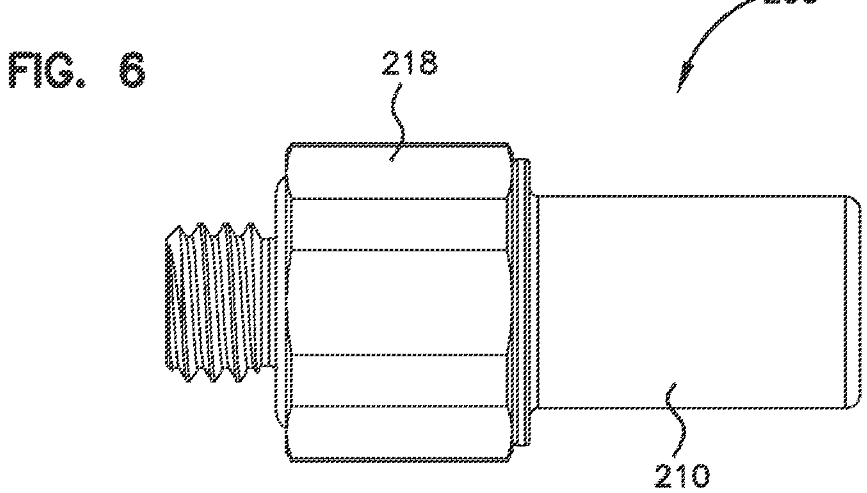
FIG. 6 is a side view of the male coupling device of FIG. 5.
Figure 7:
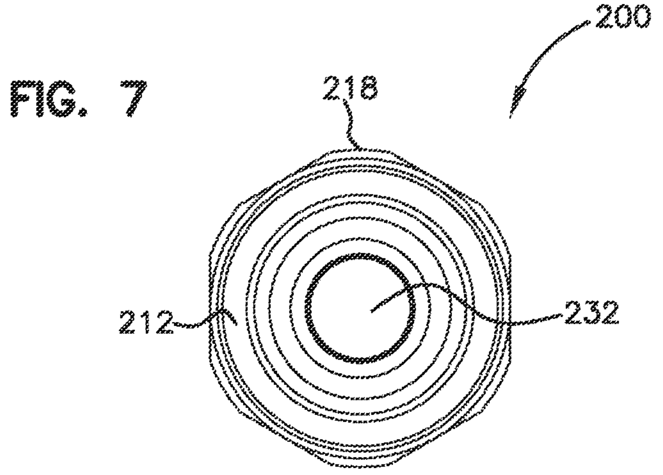
FIG. 7 is an end view of the male coupling device of FIG. 5.

The present disclosure relates to a low-spill coupling assembly including a female coupling device and a male coupling device. Additional details are provided below.

Referring now to FIGS. 1-4, an example female coupling device 100 is shown.

The female coupling device 100 includes a main body 110 having a front face 112. The front face 112 defines an opening 114 leading into a fluid passageway 122.

The female coupling device 100 also includes a termination 118 coupled to the main body 110 using known techniques, such as sonic welding, staking, press-fitting, and threading. The termination 118 is configured to be coupled to another component, such as a fluid line or device.

The example female coupling device 100 includes a stem 130, sleeve 136, and spring 124 positioned within the fluid passageway 122.

The stem 130 includes a base end 132 positioned against the termination 118. The stem 130 also includes a stem head 134 positioned within the sleeve 136. The spring 124 is positioned about the stem 130 and biases the sleeve 136 into the closed position shown in FIG. 4. In this position, a shoulder 182 on the sleeve 136 engages a surface 184 formed by the main body 110 to limit further travel of the sleeve 136 in a direction toward the front face 112.

In this position, a first seal 142 provides a seal between the main body 110 and the sleeve 136. In addition, a second seal 144 provides a seal between the sleeve 136 and the stem head 134. These seals limit movement of fluid through the fluid passageway 122.

A further third seal 146 is positioned at the opening 114 of the main body 110 to seal against a mating male coupling device 200, described below.

Referring now to FIGS. 5-8, the male coupling device 200 is shown.

The male coupling device 200 includes a main body 210 having a front face 212. The front face 212 defines an opening 214 leading into a fluid passageway 222.

The male coupling device 200 also includes a termination 218 coupled to the main body 210 using known techniques, such as sonic welding or staking. The termination 218 is configured to be coupled to another component, such as a fluid line.

The example male coupling device 200 includes a valve member 230 and spring 224 positioned within the fluid passageway 222. The spring 224 is biases the valve member 230 into the closed position shown in FIG. 8. A front surface 232 of the valve member 230 is exposed at the front face 212 of the main body 210. In this position, a shoulder 282 on the valve member 230 engages a surface 284 formed by the main body 210 to limit further travel of the valve member 230 in a direction toward the front face 212.

In this position, a first seal 242 provides a seal between the main body 210 and the valve member 230. The seal limits movement of fluid through the fluid passageway 222.

Figures 9, 10:
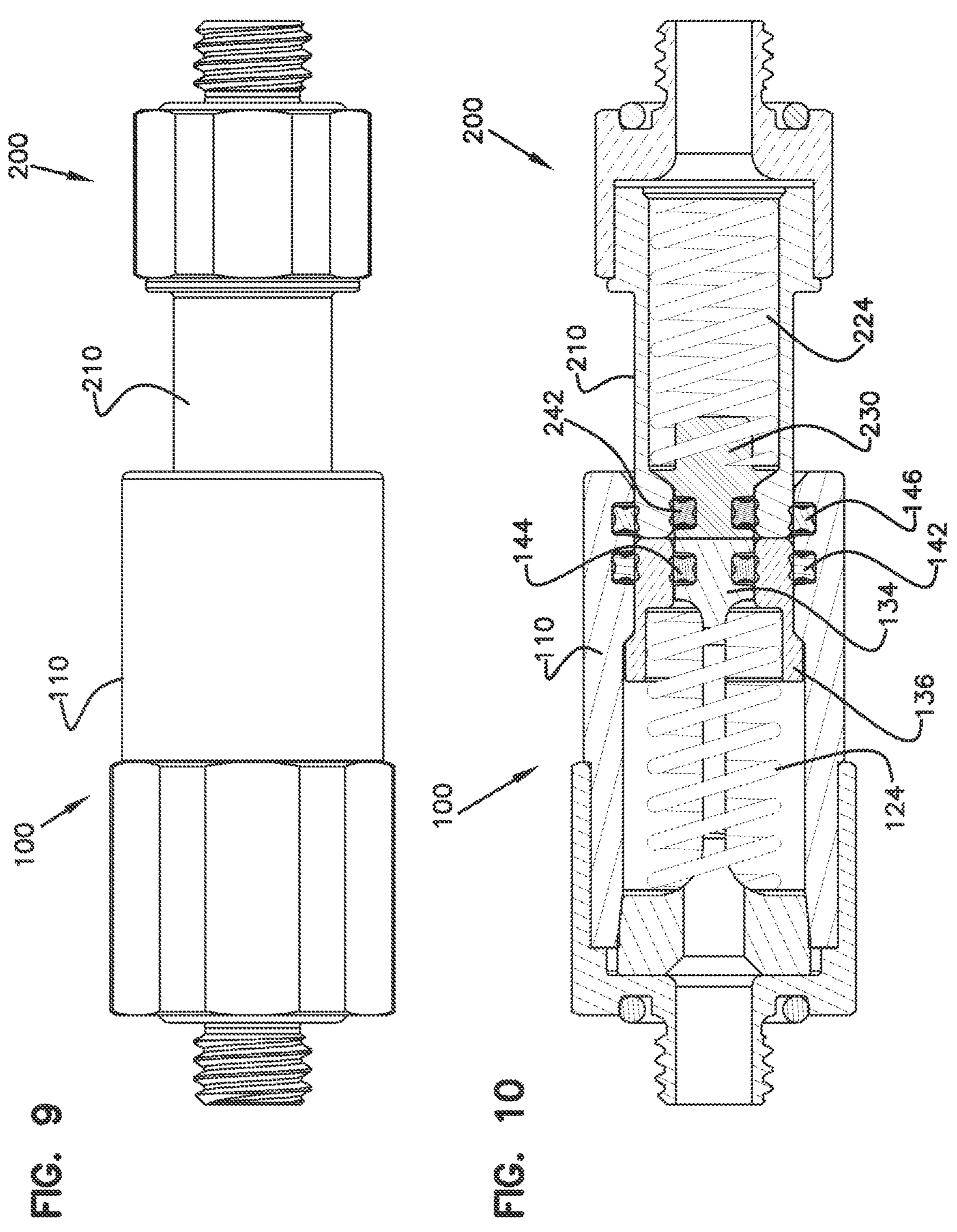
FIG. 9 is a side view of a coupling assembly including the female and male coupling devices in a pre-coupled position.
FIG. 10 is a cross-sectional view of the female and male coupling devices of FIG. 9

Referring now to FIGS. 9-10, the female coupling device 100 and the male coupling device 200 are shown in a pre-coupled position. In this position, the main body 210 of the male coupling device 200 is partially inserted into the opening 114 of the main body 110 of the female coupling device 100.

In this position, the front surface 232 of the valve member 230 engages the stem head 134. In addition, the front face 212 engages the sleeve 136. Further, the third seal 146 seals against the main body 210 of the male coupling device 200 so that a fluid-tight configuration is created.

Figures 11, 12:
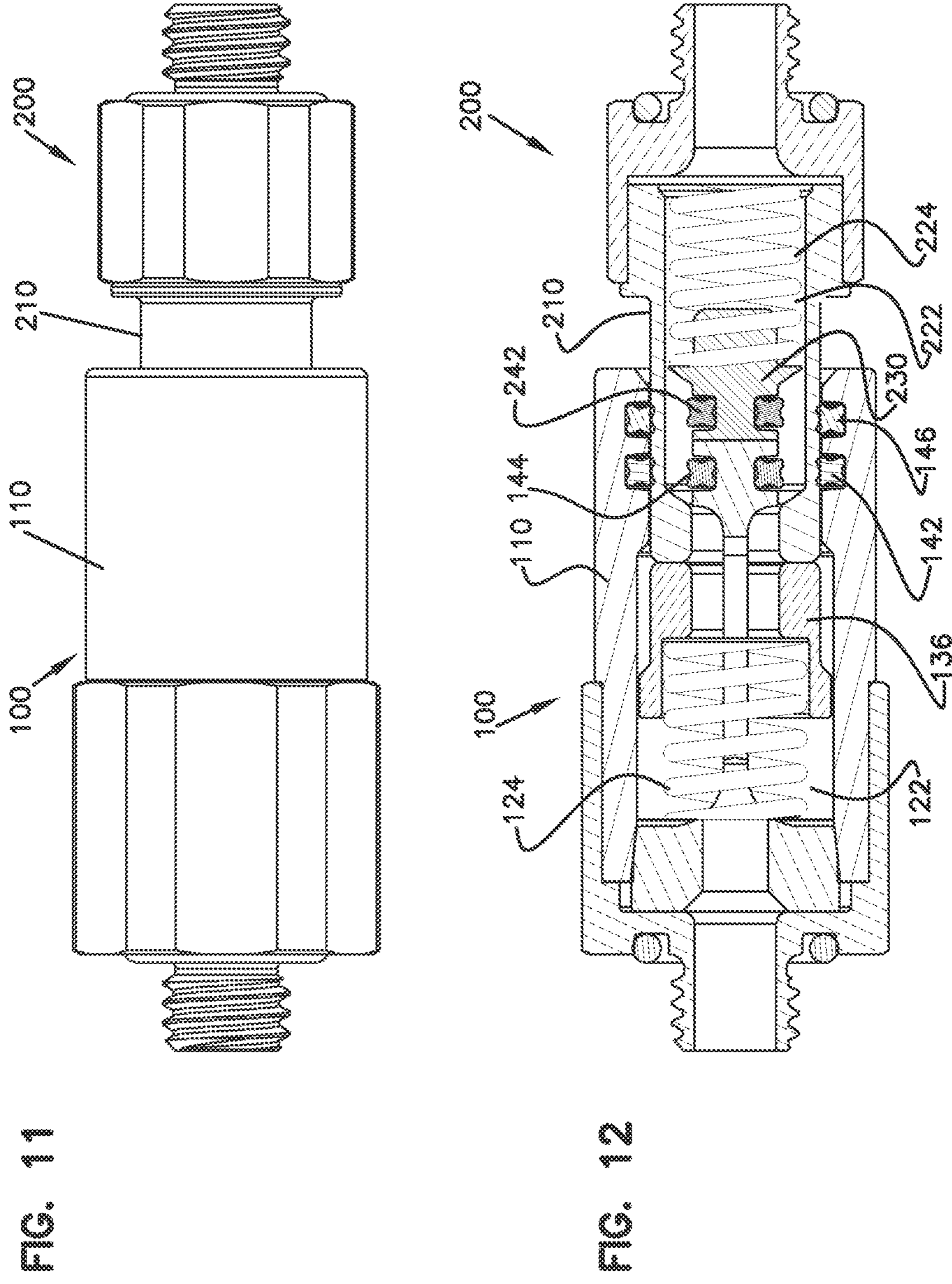
FIG. 11 is a side view of the female and male coupling devices in a partially-coupled position.
FIG. 12 is a cross-sectional view of the female and male coupling devices of FIG. 11.

Referring now to FIGS. 11-12, the female coupling device 100 and the male coupling device 200 are shown in a partially-coupled position. In this position, the main body 210 of the male coupling device 200 is more-completely inserted into the opening 114 of the main body 110 of the female coupling device 100.

As this occurs, the main body 210 of the male coupling device 200 is positioned in the fluid passageway 122 so that both seals 142, 146 engage the main body 210. Further, both the sleeve 136 and the valve member 230 are displaced against the springs 124, 224, respectively. When this occurs, the seals 144, 242 are disengaged so that fluid can start to flow through the fluid passageways 122, 222.

Figures 13, 14:
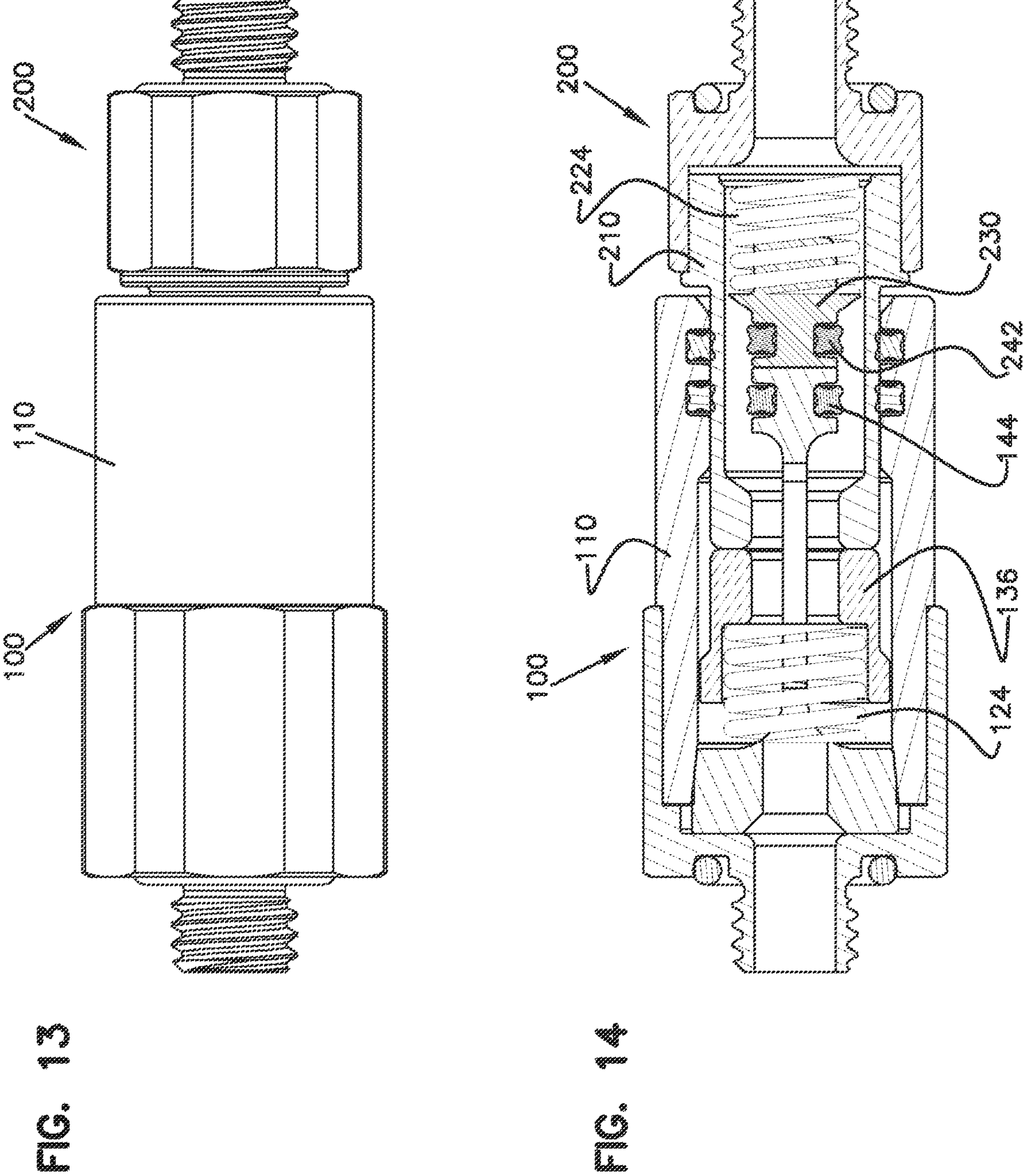
FIG. 13 is a side view of the female and male coupling devices in a fully-coupled position.
FIG. 14 is a cross-sectional view of the female and male coupling devices of FIG. 13.

Referring now to FIGS. 13-14, the female coupling device 100 and the male coupling device 200 are shown in a fully-coupled position. In this position, the main body 210 of the male coupling device 200 is completely inserted into the opening 114 of the main body 110 of the female coupling device 100.

Both of the springs 124, 224 are compressed, and the sleeve 136 and valve member 230 are further displaced. This assures that seals 144, 242 are fully disengaged so that fluid can pass through the fluid passageways 122, 222.

To release, the male coupling device 200 is pulled out of the female coupling device 100. When this occurs, the springs 124, 224 return the sleeve 136 and the valve member 230 to the resting positions shown in FIGS. 9-10.

Referring now to FIGS. 15-18, another example female coupling device 300 is shown.

The female coupling device 300 includes a main body 310 having a front face 312. The front face 312 defines an opening 314 leading into a fluid passageway 322 (see FIG. 18).

The female coupling device 300 also includes a termination 318 coupled to the main body 310 using known techniques, such as sonic welding, staking, press-fitting, and threading. The termination 318 is configured to be coupled to another component, such as a fluid line or device. The female coupling device 300 includes a locking collar, herein referred to as a quick connecting/disconnecting clip member 316, which is used to quickly disconnect and connect the female coupling device 300 with another component.

The example female coupling device 300 includes a stem 330, sleeve 336, and spring 324 positioned within the fluid passageway 322. The stem 330 includes a base end 332 positioned against the termination 318. The stem 330 also includes a stem head 334 positioned within the sleeve 336. The spring 324 is positioned about the stem 330 and biases the sleeve 336 into the closed position shown in FIG. 18. In this position, a shoulder 382 on the sleeve 336 engages a surface 384 formed by the main body 310 to limit further travel of the sleeve 336 in a direction toward the front face 312. In this position, a first seal 342 provides a seal between the main body 310 and the sleeve 336. In addition, a second seal 344 provides a seal between the sleeve 336 and the stem head 334. These seals limit movement of fluid through the fluid passageway 322. A further third seal 346 is positioned at the opening 314 of the main body 310 to seal against a mating male coupling device 400, as described below.

Figure 15:
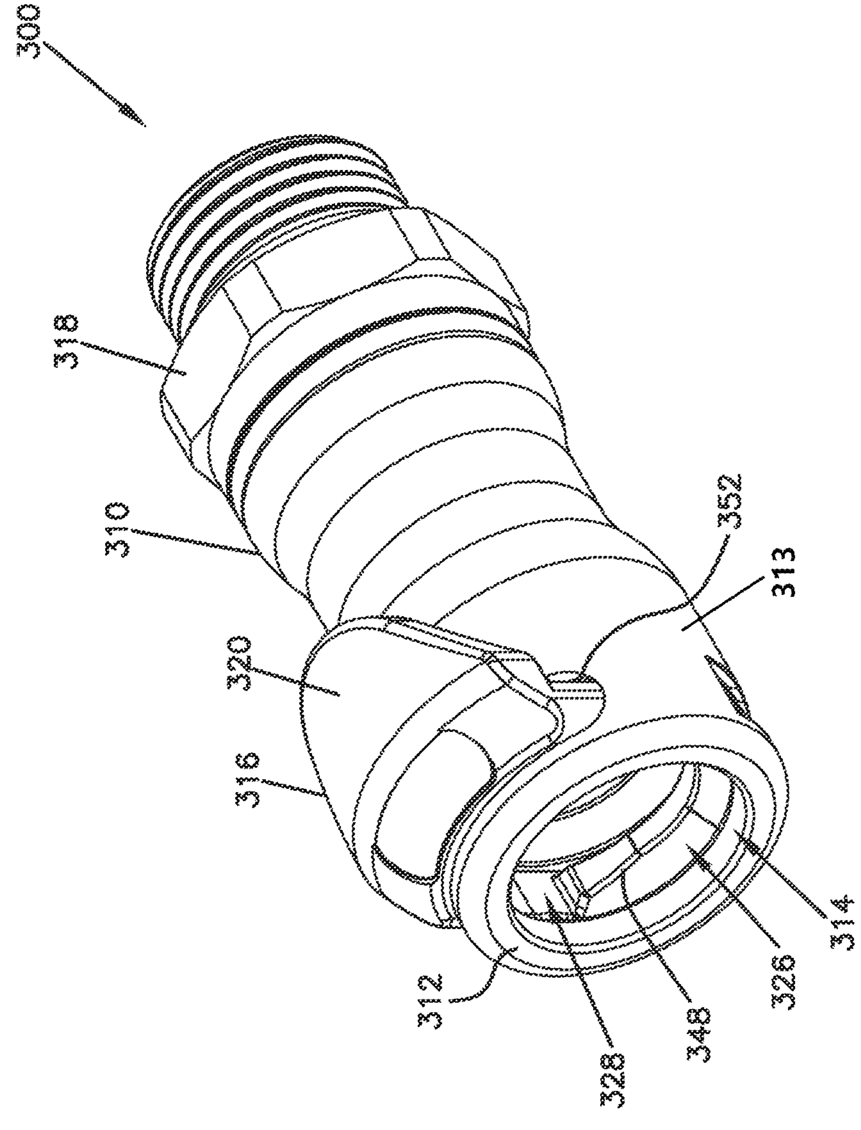
FIG. 15 is a perspective view of another example female coupling device.
Figure 16:
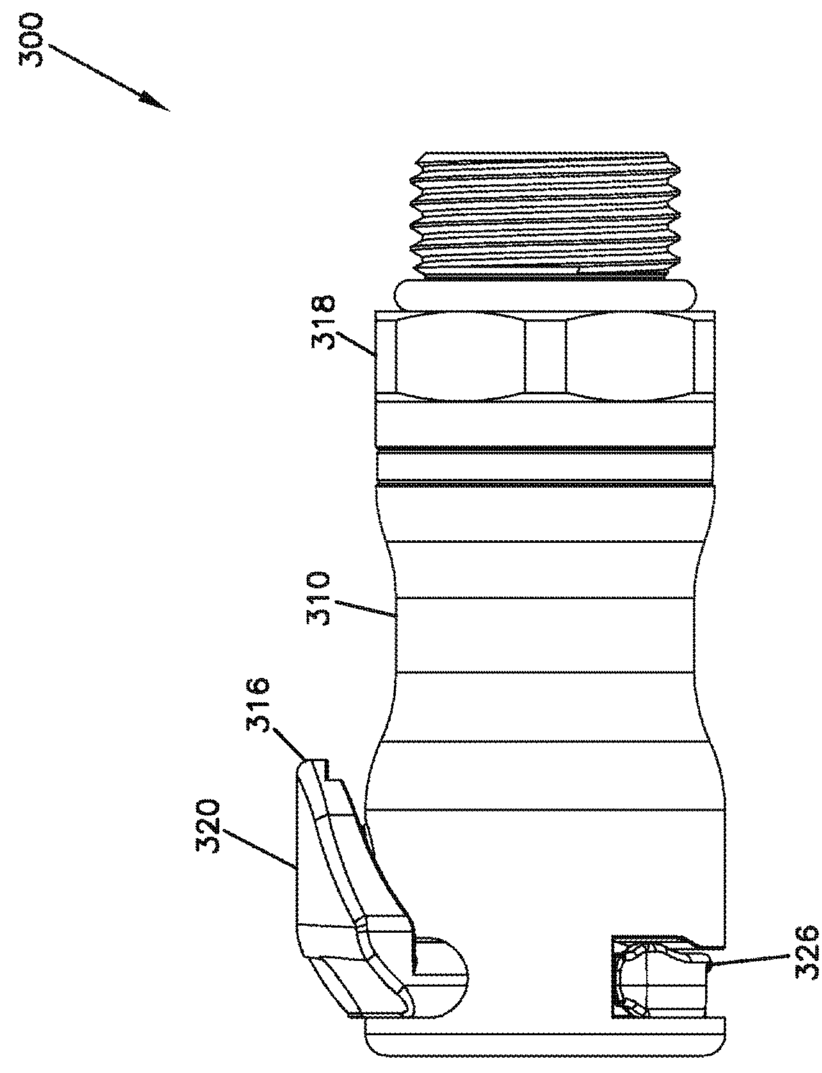
FIG. 16 is a side view of the female coupling device of FIG. 15.
Figure 17:
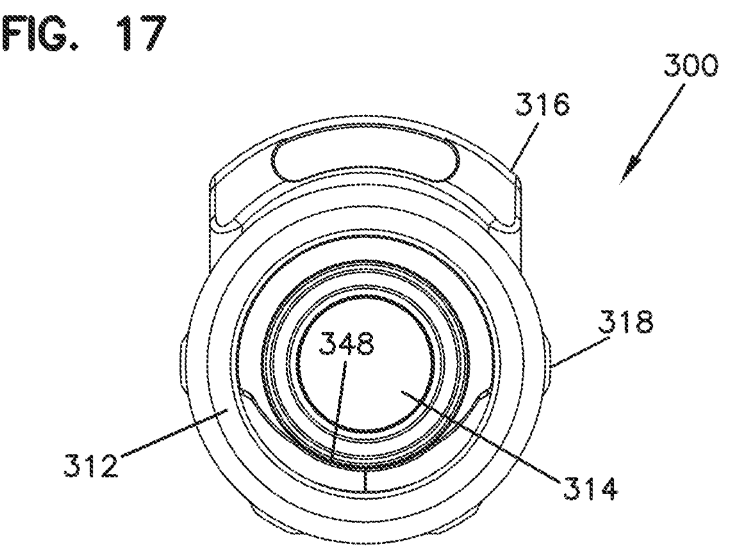
FIG. 17 is an end view of the female coupling device of FIG. 15.
Figure 18:
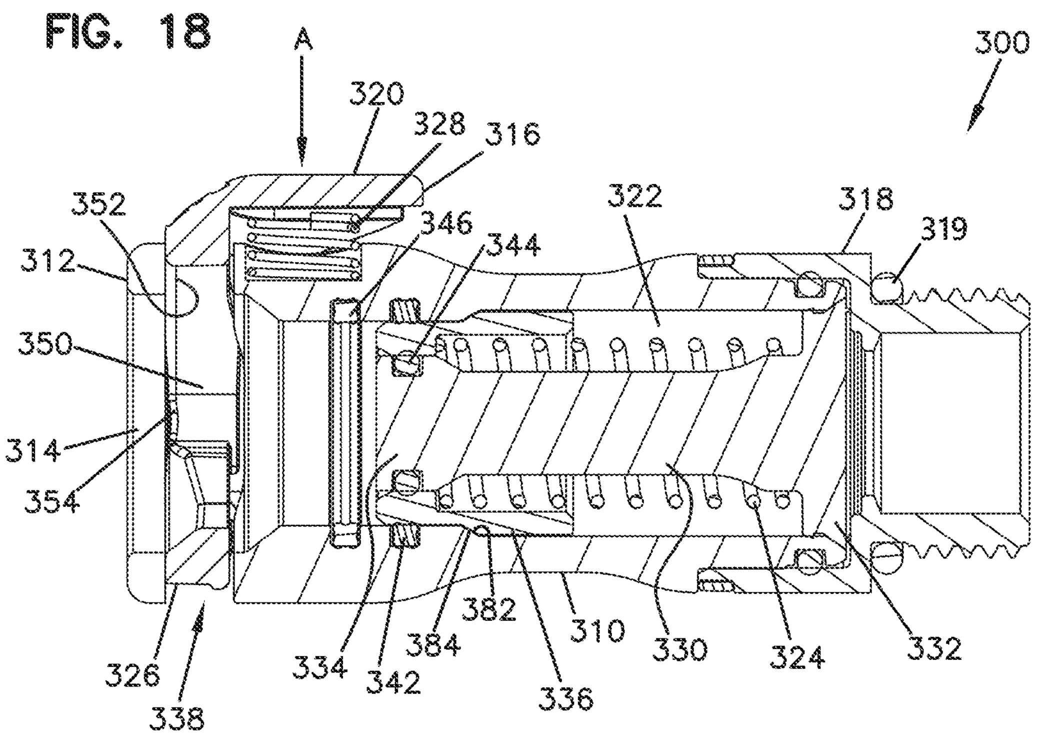
FIG. 18 is a cross-sectional view of the female coupling device of FIG. 15.
Figure 19:
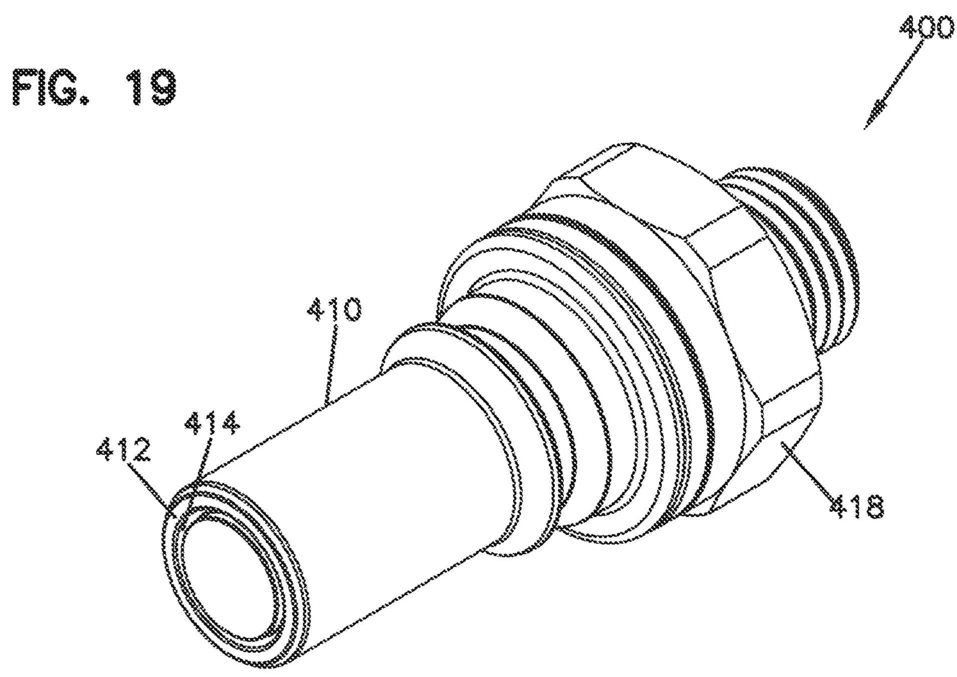
FIG. 19 is a perspective view of another example male coupling device.
Figure 20:
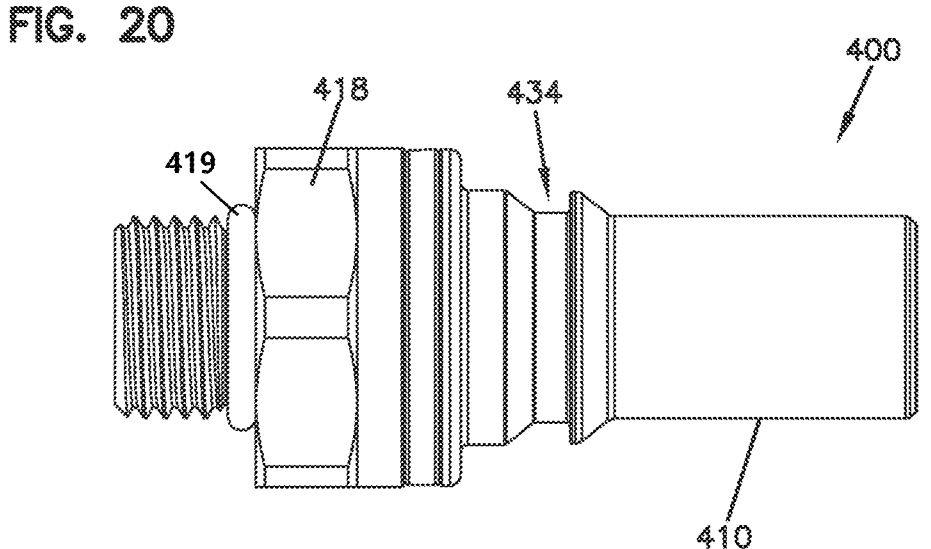
FIG. 20 is a side view of the male coupling device of FIG. 19.
Figures 21, 22:
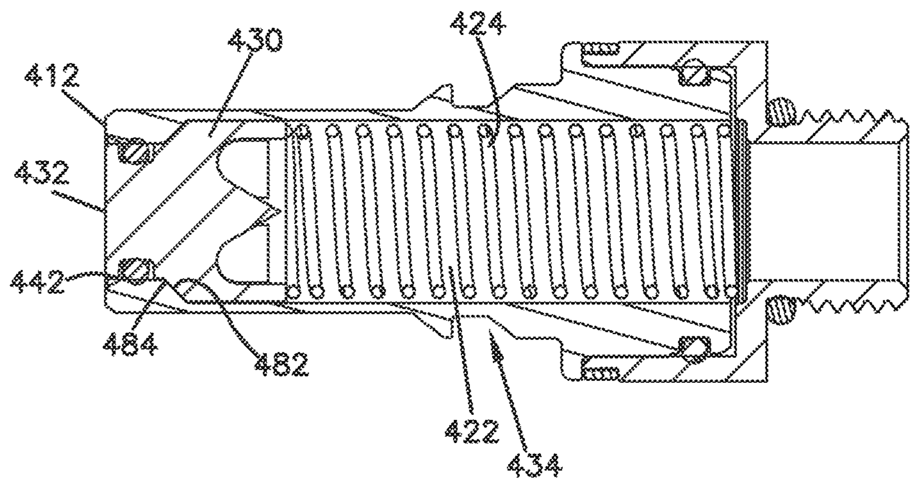
FIG. 21 is an end view of the male coupling device of FIG. 19.
FIG. 22 is a cross-sectional view of the male coupling device of FIG. 19.

In the depicted example, the clip member 316 includes a tab portion 320 and a plate portion 326 interconnected to each other at roughly a right angle in a generally L-shaped configuration. In FIG. 15, the clip member 316 is in a resting or locking position. The clip member 316 can be biased or forced into the locked position using an integral cantilever or spring 328 (see FIG. 18). The clip member 316 is moved in a direction A within an opening 338 of the main body 310 to an unlocked position. The clip member 316 can be moved to this position to, for example, connect or release another component, such as, an insert.

The tab portion 320 of the clip member 316 provides a surface for the user to press down on the clip member 316 so as to place the clip member 316 in the disconnecting position when inserting the mating male coupling device 400. In some examples, it is not necessary to manually force down on the clip member 316 when inserting the mating male coupling device 400 as the mating male coupling device 400 upon engagement with an inner lip 348 (see FIG. 15) of the plate portion 326 will force the clip member 316 down into the disconnecting position. The plate portion 326 defines an aperture 350 (see FIG. 18) sufficiently large to allow the mating male coupling device 400 to extend partially therethrough and is generally alignable with the fluid passageway 322 of the female coupling device 300. The plate portion 326 slides in a slot 352 extending transversely of the female coupling device 300.

In one example, side surfaces of the female coupling device 300 can include a shoulder portion and the plate portion 326 of the clip member 316 can include barbed projections along its side edge. The barbed projections can have a substantially flat portion for engaging the shoulder portion of the female coupling device 300 so as to prevent the clip member 316 from being inadvertently removed from the female coupling device 300 after it has been inserted. This assures that the clip member 316 will remain with the female coupling device 300 at all times in typical use.

Referring now to FIGS. 19-22, the male coupling device 400 is shown.

The male coupling device 400 includes a main body 410 having a front face 412. The front face 412 defines an opening 414 leading into a fluid passageway 422 (see FIG. 22).

The male coupling device 400 also includes a termination 418 coupled to the main body 410 using known techniques, such as sonic welding or staking. The termination 418 is configured to be coupled to another component, such as a fluid line.

The example male coupling device 400 includes a valve member 430 and spring 424 positioned within the fluid passageway 422. The spring 424 biases the valve member 430 into the closed position shown in FIG. 22. A front surface 432 of the valve member 430 is exposed at the front face 412 of the main body 410. In this position, a shoulder 482 on the valve member 430 engages a surface 484 formed by the main body 410 to limit further travel of the valve member 430 in a direction toward the front face 412.

In this position, a first seal 442 (e.g., major seal) provides a seal between the main body 410 and the valve member 430. The seal limits movement of fluid through the fluid passageway 422.

Figure 23:
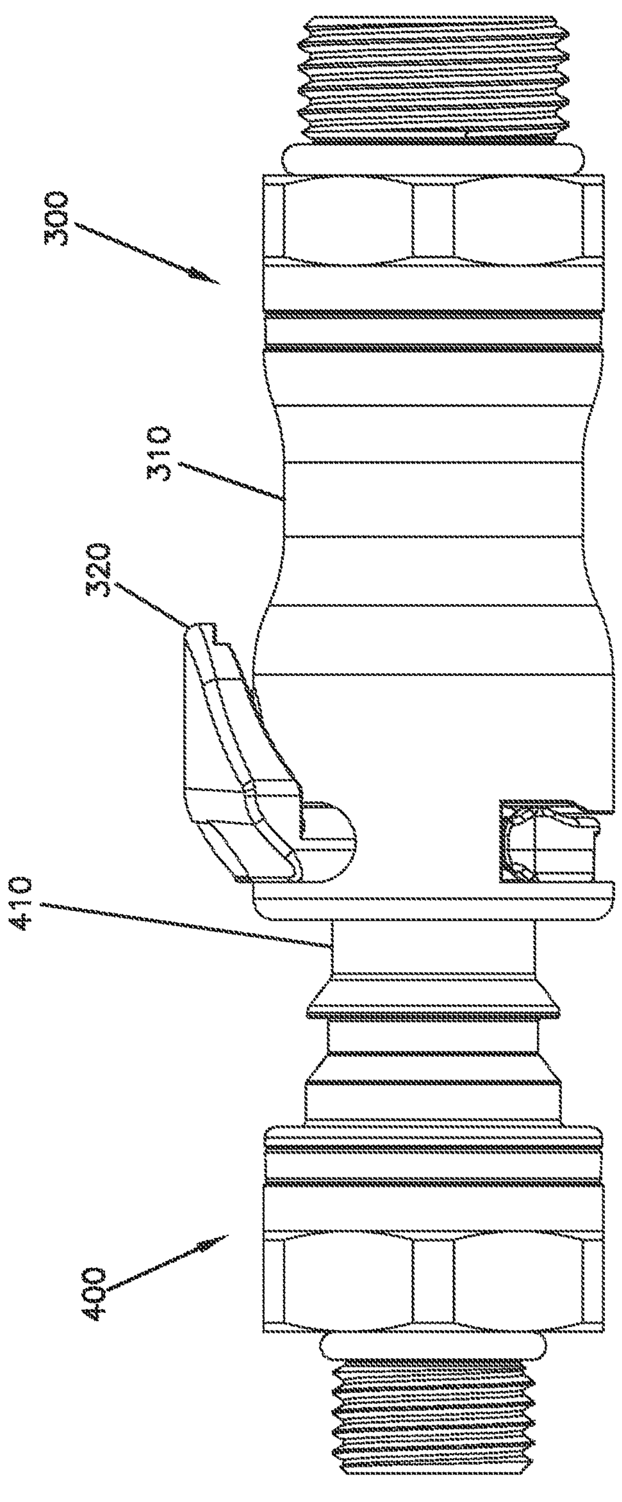
FIG. 23 is a side view of a coupling assembly including the female and male coupling devices shown in FIGS. 15 and 19 in a pre-coupled position.
Figure 24:
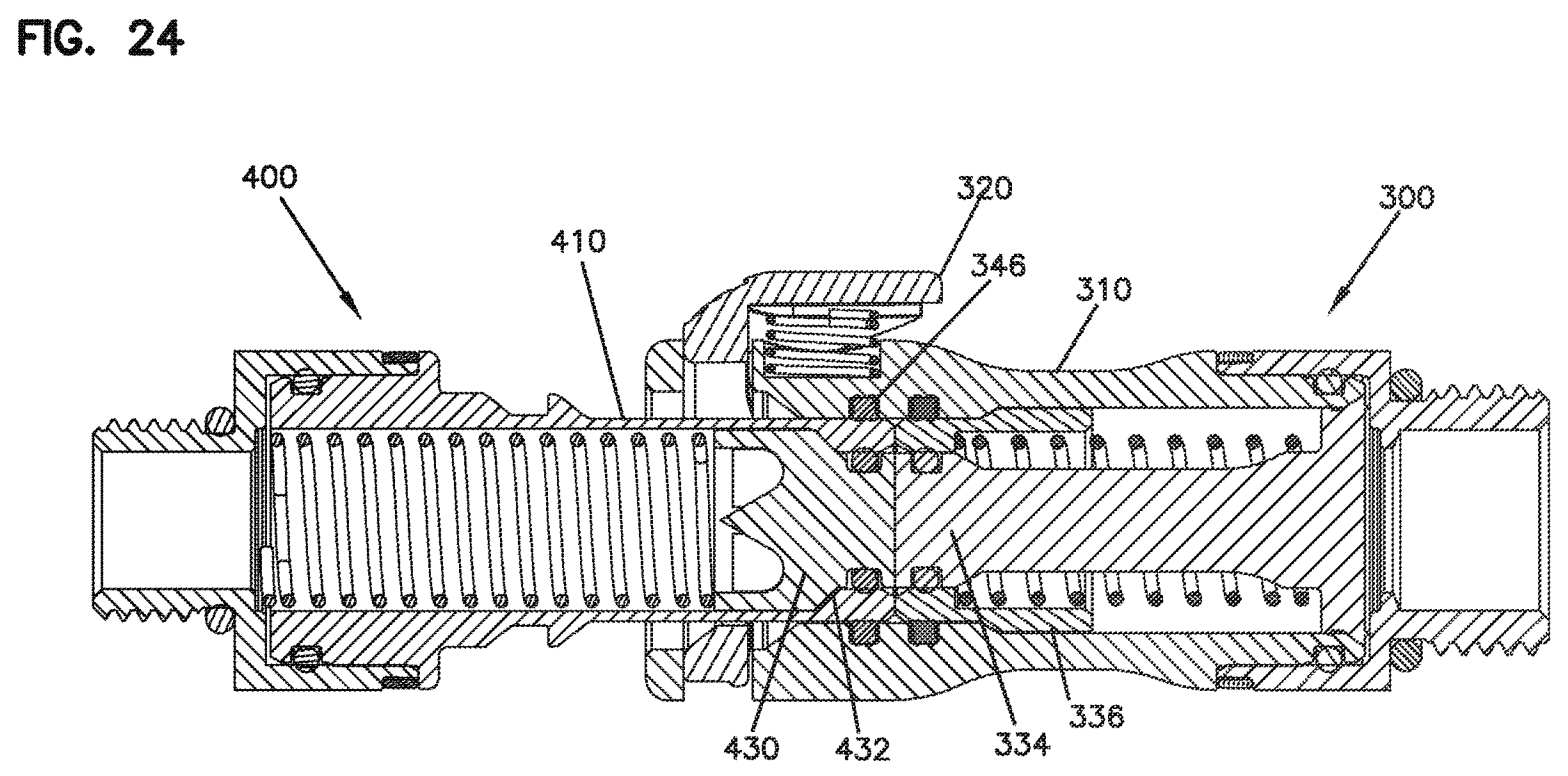

Referring now to FIGS. 23-24, the female coupling device 300 and the male coupling device 400 are shown in a pre-coupled position. In this position, the main body 410 of the male coupling device 400 is partially inserted into the opening 314 of the main body 310 of the female coupling device 300.

In this position, the front surface 432 of the valve member 430 engages the stem head 334. In addition, the front face 432 engages the sleeve 336. Further, the third seal 346 seals against the main body 410 of the male coupling device 400 so that a fluid-tight configuration is created.

Figure 25:
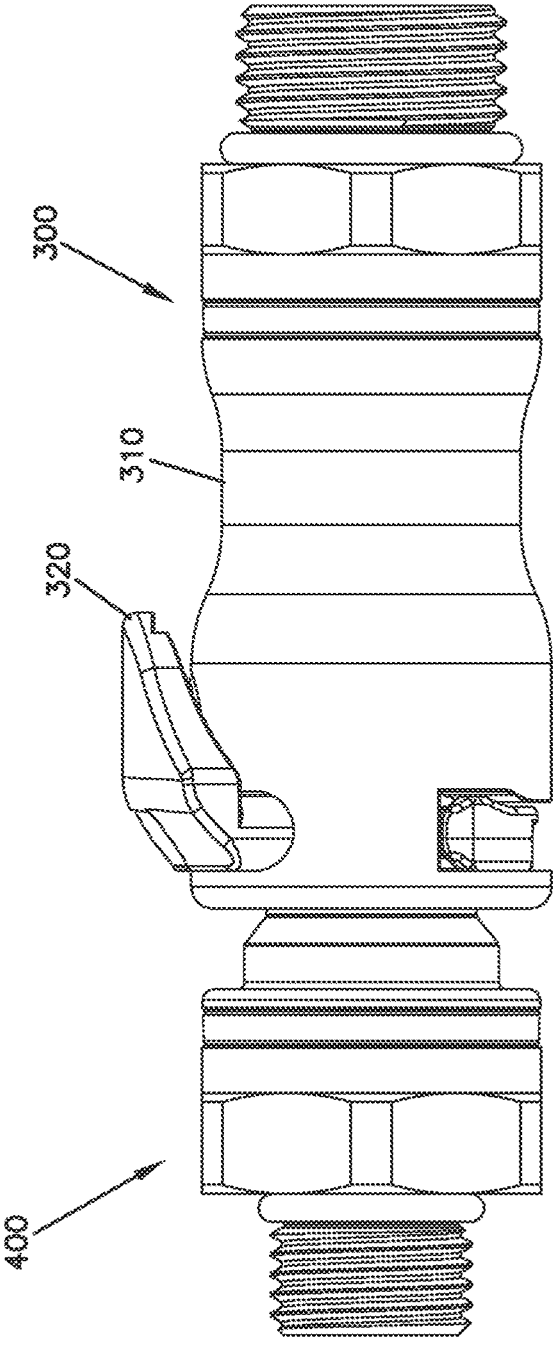
FIG. 25 is a side view of the female and male coupling devices shown in FIGS. 15 and 19 in a partially-coupled position.
Figure 26:
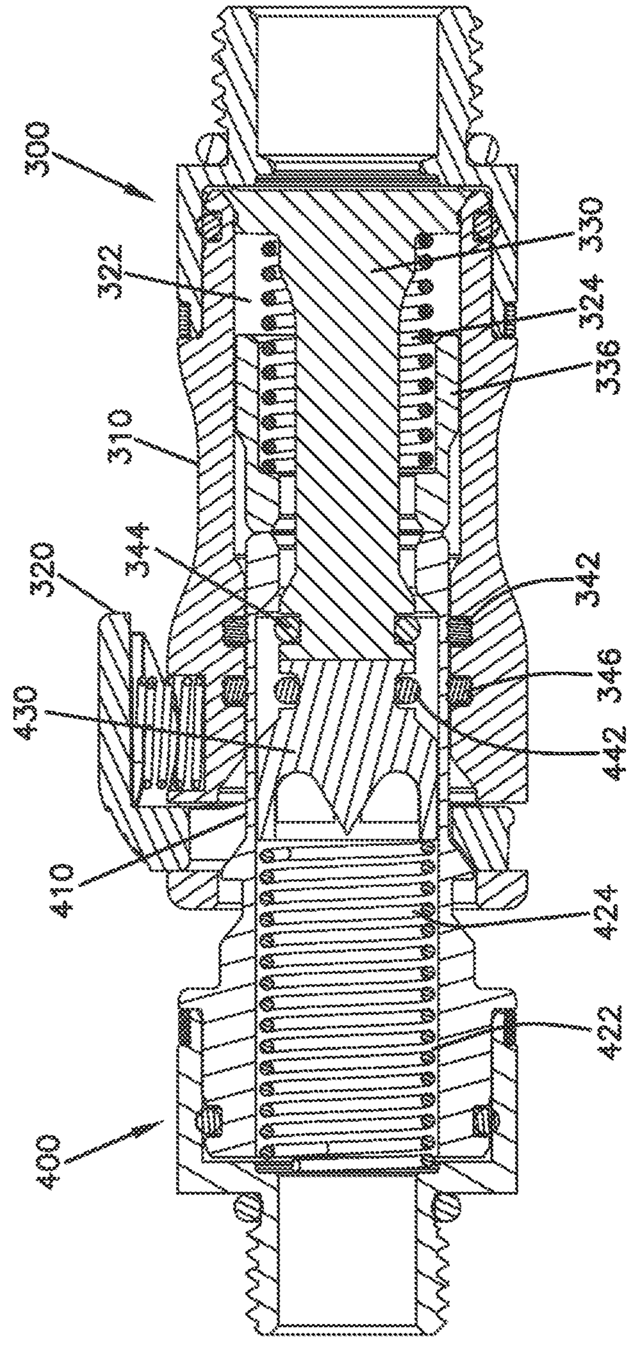
FIG. 26 is a cross-sectional view of the female and male coupling devices of FIG. 25.

Referring now to FIGS. 25-26, the female coupling device 300 and the male coupling device 400 are shown in a partially-coupled position. In this position, the main body 410 of the male coupling device 400 is more-completely inserted into the opening 314 of the main body 310 of the female coupling device 300.

As this occurs, the main body 410 of the male coupling device 400 is positioned in the fluid passageway 322 so that both seals 342, 346 engage the main body 410. Further, both the sleeve 336 and the valve member 430 are displaced against the springs 324, 424, respectively.

When this occurs, the seals 344, 442 are disengaged so that fluid can start to flow through the fluid passageways 322, 422.

Figure 27:
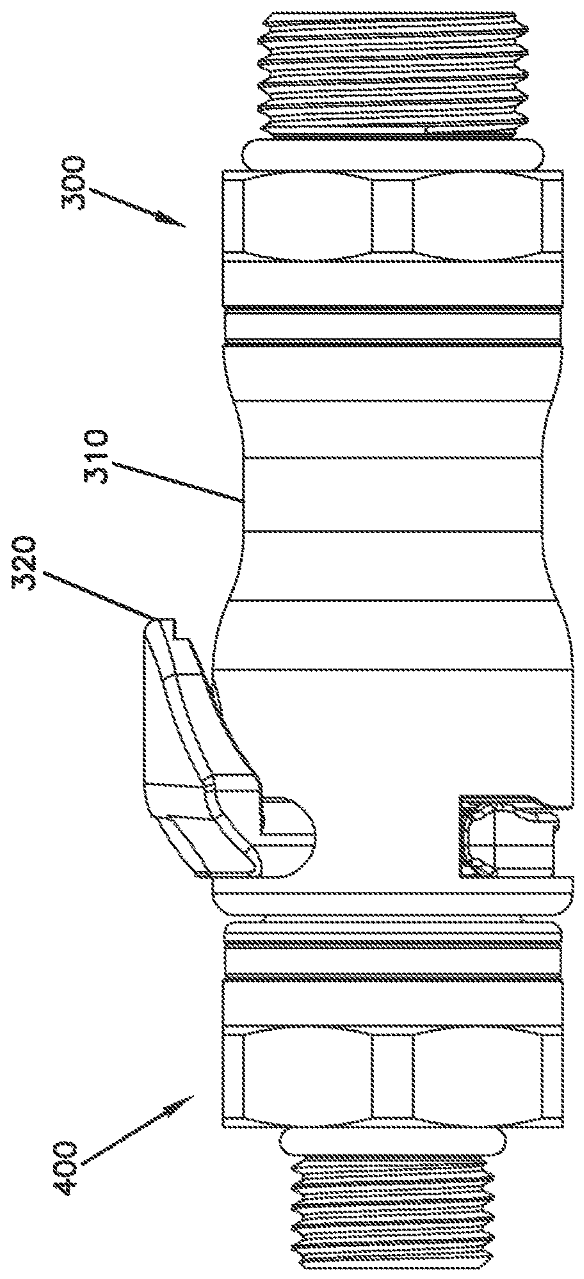
FIG. 27 is a side view of the female and male coupling devices shown in FIGS. 15 and 19 in a fully-coupled position.
Figure 28:
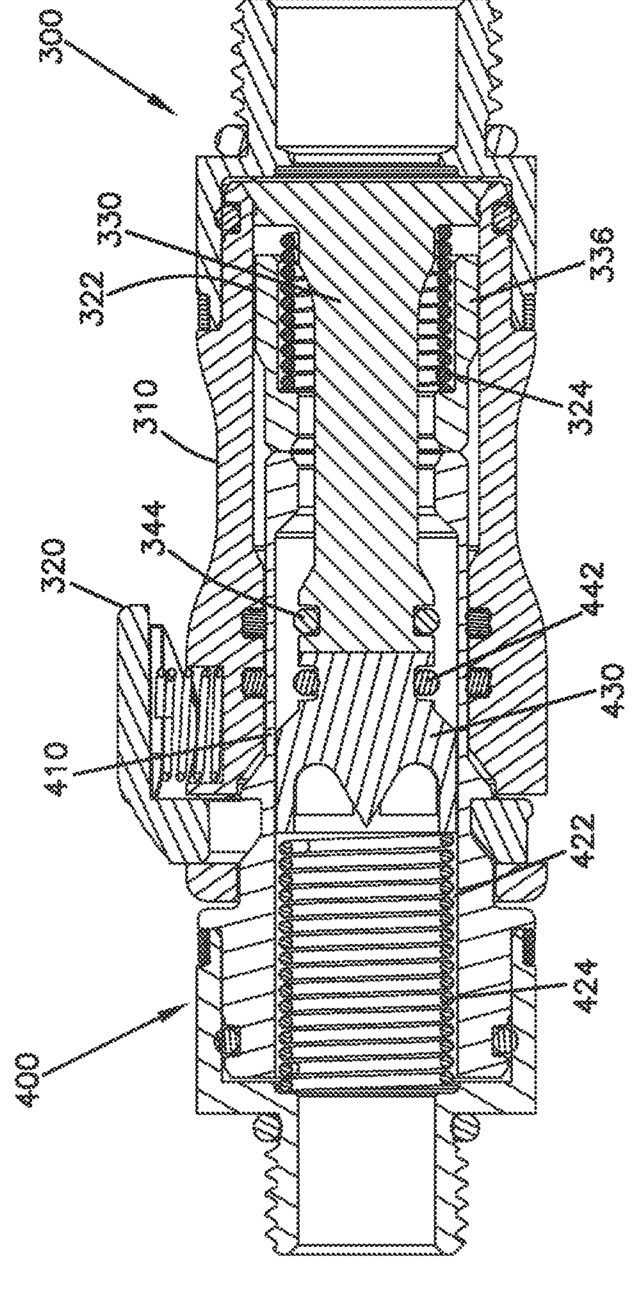
FIG. 28 is a cross-sectional view of the female and male coupling devices of FIG. 27.

Referring now to FIGS. 27-28, the female coupling device 300 and the male coupling device 400 are shown in a fully-coupled position. In this position, the main body 410 of the male coupling device 400 is completely inserted into the opening 314 of the main body 310 of the female coupling device 300.

Both of the springs 324, 424 are compressed, and the sleeve 336 and valve member 430 are further displaced. This assures that seals 344, 442 are fully disengaged so that fluid can pass through the fluid passageways 322, 422.

To release, the male coupling device 400 is pulled out of the female coupling device 300. When this occurs, the springs 324, 424 return the sleeve 336 and the valve member 430 to the resting positions shown in FIGS. 23-24.

In certain examples, the spring 328 (e.g., resilient biasing member) is disposed below the tab portion 320. Upon pressing down on the clip member 316, the spring 328 is displaced from its at rest position to a displaced position. The clip member 316 is then biased upwardly such that the plate portion 326 rests in a circumferential groove 434 of the male coupling device 400 when in the connecting position. In other words, the clip member 316 is biased upwardly such that when the circumferential groove 434 of the male coupling device 400 is aligned with the inner lip 348 of the plate portion 326 of the clip member 316, the spring 328 will force the clip member 316 upward into engagement with the circumferential groove 434 thereby placing the clip member 316 into the connecting position and retaining the male and female coupling devices 300, 400 in a coupled state upon the application of the fluid pressure.

In other examples, by merely inserting the male coupling device 400, the clip member 316 will be forced down into its disconnecting position thereby doing away with the need for the user to press down on the tab portion 320 of the clip member 316. To uncouple the coupling the user simply presses down on the clip member 16 and removes the male coupling device 400.

Additional details about an example latched coupling assembly are provided in U.S. Pat. No. 7,547,047 to deCler et al. and U.S. Pat. No. 5,104,158 to Meyer et al., the entirety of which are hereby incorporated by reference.

Although the subject matter has been described in language specific to structural features and/or methodological acts, it is to be understood that the subject matter defined in the appended claims is not necessarily limited to the specific features or acts described above.

Rather, the specific features and acts described above are disclosed as example forms of implementing the claims.

What is claimed is:

1. A female coupling device configured to releasably receive a male coupling device, wherein the female coupling device comprises:

a female body comprising:

a front face at a front-most end of the female body;

a circular opening in the front face;

a first interior bore having a first interior bore diameter, wherein the first interior bore is positioned rearwardly of the circular opening and has a first interior longitudinal length, and wherein the first interior bore diameter is a minimum diameter of a cylindrical interior fluid passageway defined by the first interior bore;

a first interior transition surface at a rearward end of the first interior bore which defines a rearward end of the first interior longitudinal length;

a second interior bore having a second interior bore diameter, wherein the second interior bore extends rearwardly from the first interior transition surface for a second interior longitudinal length, wherein the second interior bore diameter is a minimum diameter of a cylindrical interior fluid passageway defined by the second interior bore, and wherein the second interior bore diameter is smaller than the first interior bore diameter;

a second interior transition surface at a rearward end of the second interior bore which defines a rearward end of the second interior longitudinal length;

a third interior bore having a third interior bore diameter, wherein the third interior bore extends rearwardly from the second interior transition surface for a third interior longitudinal length, wherein the third interior bore diameter is a minimum diameter of a cylindrical interior fluid passageway defined by the third interior bore, wherein the third interior bore diameter is greater than the second interior bore diameter, and wherein the third interior longitudinal length is greater than the second interior longitudinal length;

first and second interior bore seal grooves, wherein the first interior bore seal groove is disposed between the first interior transition surface and the second interior bore seal groove, and wherein the second interior bore seal groove is disposed between the second interior transition surface and the first interior bore seal groove;

an aperture disposed in a portion of the female body, wherein the aperture is rearward of the front-most end of the female body and forward of the first interior bore seal groove, and wherein the aperture provides a passageway between an exterior of the female body and the first interior bore;

a first bore seal seated in the first interior bore seal groove;

a second bore seal seated in the second interior bore seal groove;

a stem comprising:

a stem head having a stem front face and a stem seal groove located rearward of the stem front face, wherein the stem head is configured to remain stationary relative to the front-most end of the female body, wherein the second interior bore seal groove and the stem seal groove are arranged to be facing each other, wherein the stem front face is positioned within the second interior bore, and wherein the stem front face is positioned at a same or greater longitudinal distance from the front face as the first bore seal, and at a lesser longitudinal distance than the second interior transition surface; and a stem seal seated in the stem seal groove; and a movable sleeve having a sleeve front face disposed to face toward the circular opening of the front-most end of the female body and configured to slide in a rearward direction relative to the stem head such that the stem seal is releasably engageable with an interior circumferential sleeve surface of the movable sleeve and the second bore seal is releasably engageable with an exterior circumferential sleeve surface of the movable sleeve, wherein the movable sleeve is spring biased toward a closed position in which the sleeve front face is aligned with the stem front face and in which the movable sleeve is configured to abut with the second interior transition surface of the female body and to engage with both the second bore seal and the stem seal, and wherein the movable sleeve is configured to slide in the rearward direction such that, as the female coupling device releasably receives the male coupling device into a fully-coupled position, the movable sleeve is configured to disengage from both the stem seal and the second bore seal.

2. The female coupling device according to claim 1, wherein a shortest longitudinal distance from the second interior bore seal groove to the front face of the female body is less than a shortest longitudinal distance from the stem seal groove to the front face of the female body.

3. The female coupling device according to claim 1, wherein a largest longitudinal distance from the second interior bore seal groove to the front face of the female body is less than a largest longitudinal distance from the stem seal groove to the front face of the female body.

4. The female coupling device according to claim 1, wherein the front face of the female body is positioned at a front-most end of the female coupling device.

5. The female coupling device according to claim 1, further comprising a retainer, wherein a first portion of the retainer is configured to move through the aperture and into the first interior bore, wherein a bias spring is configured to urge the first portion of the retainer toward the first interior bore, and wherein the first portion of the retainer is further configured to contact a surface of the male coupling device to prevent the male coupling device from decoupling from the female coupling device when the female coupling device releasably receives the male coupling device in the fully-coupled position.

6. The female coupling device according to claim 1, further comprising a retaining clip, wherein a first portion of the retaining clip is configured to move through the aperture towards an interior of the first interior bore, wherein a second portion of the retaining clip is configured to engage with a bias spring configured to position the first portion of the retaining clip towards the interior of the first interior bore when the movable sleeve is in the closed position, and wherein the first portion of the retaining clip is further configured to contact a surface of the male coupling device to prevent the male coupling device from decoupling from the female coupling device when the female coupling device releasably receives the male coupling device in the fully-coupled position.

7. The female coupling device according to claim 6, further comprising: a stem base, wherein a portion of the stem base has a diameter at least as great as the third interior bore diameter of the third interior bore of the female body.

8. The female coupling device according to claim 7, wherein a maximum diameter of the stem base is located at a rear-most end of the stem.

9. The female coupling device according to claim 7, further comprising: one or more rear exterior connection ridges configured to be coupled to a fluid conduit and positioned rearwardly of an exterior ring seal.

10. The female coupling device according to claim 9, further comprising: exterior opposing flat surfaces positioned forward of the one or more rear exterior connection ridges.

11. The female coupling device according to claim 10, wherein the one or more rear exterior connection ridges comprise at least one thread.

12. The female coupling device according to claim 10, wherein the exterior opposing flat surfaces form a broken hexagonal shape.

13. The female coupling device according to claim 9, wherein a shortest longitudinal distance from the first interior bore seal groove to a front-most end of the second interior bore is less than a shortest longitudinal distance from the first interior bore seal groove to a rear-most end of the second interior bore.

14. A female coupling device configured to releasably receive a male coupling device, wherein the female coupling device comprises:

a female body comprising:

a front face at a front-most end of the female body;

a circular opening in the front face;

a first interior bore having a first interior bore diameter, wherein the first interior bore is positioned rearwardly of the circular opening and has a first interior longitudinal length, and wherein the first interior bore diameter is a minimum diameter of a cylindrical interior fluid passageway defined by the first interior bore;

a first interior transition surface at a rearward end of the first interior bore which defines a rearward end of the first interior longitudinal length;

a second interior bore having a second interior bore diameter, wherein the second interior bore extends rearwardly from the first interior transition surface for a second interior longitudinal length, wherein the second interior bore diameter is a minimum diameter of a cylindrical interior fluid passageway defined by the second interior bore, and wherein the second interior bore diameter is smaller than the first interior bore diameter;

a second interior transition surface at a rearward end of the second interior bore which defines a rearward end of the second interior longitudinal length;

a third interior bore having a third interior bore diameter, wherein the third interior bore diameter is a minimum diameter of a cylindrical interior fluid passageway defined by the third interior bore, and wherein the third interior bore diameter is greater than the second interior bore diameter;

first and second interior bore seal grooves, wherein the first interior bore seal groove is disposed between the first interior transition surface and the second interior bore seal groove, and wherein the second interior bore seal groove is disposed between the second interior transition surface and the first interior bore seal groove;

an aperture disposed in a portion of the female body, wherein the aperture is rearward of the front-most end of the female body and forward of the first interior bore seal groove, and wherein the aperture provides a passageway between an exterior of the female body and the first interior bore;

a first bore seal seated in the first interior bore seal groove;

a second bore seal seated in the second interior bore seal groove;

a stem comprising:

a stem head having a stem front face and a stem seal groove located rearward of the stem front face, wherein the stem head is configured to remain stationary relative to the front-most end of the female body, wherein the second interior bore seal groove and the stem seal groove open toward one another and at least partly overlap in a longitudinal direction, wherein the stem front face is positioned within the second interior bore, wherein the stem front face is positioned at a same or greater longitudinal distance from the front face as the first bore seal, and at a lesser longitudinal distance than the second interior transition surface, and wherein the stem front face is disposed to face toward the circular opening of the front-most end of the female body and to be perpendicular to a longitudinal axis of the second interior bore, the longitudinal axis of the second interior bore being located at a center of the second interior bore; and a stem seal seated in the stem seal groove; and a movable sleeve having a sleeve front face disposed to face toward the circular opening of the front-most end of the female body and configured to slide in a rearward direction relative to the stem head such that the stem seal is releasably engageable with an interior circumferential sleeve surface of the movable sleeve and the second bore seal is releasably engageable with an exterior circumferential sleeve surface of the movable sleeve, wherein the movable sleeve is spring biased toward a closed position in which the sleeve front face is aligned with the stem front face and in which the movable sleeve is configured to abut with the second interior transition surface of the female body and to engage with both the second bore seal and the stem seal, and wherein the movable sleeve is configured to slide in the rearward direction such that, as the female coupling device releasably receives the male coupling device into a fully-coupled position, the movable sleeve is configured to disengage from both the stem seal and the second bore seal.

15. The female coupling device according to claim 14, wherein a shortest longitudinal distance from the second interior bore seal groove to the front face of the female body is less than a shortest longitudinal distance from the stem seal groove to the front face of the female body.

16. The female coupling device according to claim 14, wherein a largest longitudinal distance from the second interior bore seal groove to the front face of the female body is less than a largest longitudinal distance from the stem seal groove to the front face of the female body.

17. The female coupling device according to claim 14, wherein the front face of the female body is positioned at a front-most end of the female coupling device.

18. The female coupling device according to claim 14, further comprising a retainer, wherein a first portion of the retainer is configured to move through the aperture and into the first interior bore, wherein a bias spring is configured to urge the first portion of the retainer toward the first interior bore, and wherein the first portion of the retainer is further configured to contact a surface of the male coupling device to prevent the male coupling device from decoupling from the female coupling device when the female coupling device releasably receives the male coupling device in the fully-coupled position.

19. The female coupling device according to claim 14, further comprising a retaining clip, wherein a first portion of the retaining clip is configured to move through the aperture towards an interior of the first interior bore, wherein a second portion of the retaining clip is configured to engage with a bias spring configured to position the first portion of the retaining clip towards the interior of the first interior bore when the movable sleeve is in the closed position, and wherein the first portion of the retaining clip is further configured to contact a surface of the male coupling device to prevent the male coupling device from decoupling from the female coupling device when the female coupling device releasably receives the male coupling device in the fully-coupled position.

20. The female coupling device according to claim 19, further comprising: a stem base, wherein a portion of the stem base has a diameter at least as great as the third interior bore diameter of the third interior bore of the female body.

21. The female coupling device according to claim 20, further comprising: one or more rear exterior connection ridges configured to be coupled to a fluid conduit and positioned rearwardly of an exterior ring seal.

22. The female coupling device according to claim 21, further comprising: exterior opposing flat surfaces positioned forward of the one or more rear exterior connection ridges.

23. The female coupling device according to claim 22, wherein the one or more rear exterior connection ridges comprise at least one thread.

24. The female coupling device according to claim 22, wherein the exterior opposing flat surfaces form a broken hexagonal shape.

25. The female coupling device according to claim 21, wherein a shortest longitudinal distance from the first interior bore seal groove to a front-most end of the second interior bore is less than a shortest longitudinal distance from the first interior bore seal groove to a rear-most end of the second interior bore.

26. The female coupling device according to claim 25, wherein the third interior bore extends rearwardly from the second interior transition surface for a third interior longitudinal length that is greater than the second interior longitudinal length.

27. A coupling system comprising:

a female coupling device comprising:

a female body comprising:

a front face at a front-most end of the female body;

a circular opening in the front face;

a first interior bore having a first interior bore diameter, wherein the first interior bore is positioned rearwardly of the circular opening and has a first interior longitudinal length, and wherein the first interior bore diameter is a minimum diameter of a cylindrical interior fluid passageway defined by the first interior bore;

a first interior transition surface at a rearward end of the first interior bore which defines a rearward end of the first interior longitudinal length;

a second interior bore having a second interior bore diameter, wherein the second interior bore extends rearwardly from the first interior transition surface for a second interior longitudinal length, wherein the second interior bore diameter is a minimum diameter of a cylindrical interior fluid passageway defined by the second interior bore, and wherein the second interior bore diameter is smaller than the first interior bore diameter;

a second interior transition surface at a rearward end of the second interior bore which defines a rearward end of the second interior longitudinal length;

a third interior bore having a third interior bore diameter, wherein the third interior bore diameter is a minimum diameter of a cylindrical interior fluid passageway defined by the third interior bore, and wherein the third interior bore diameter is greater than the second interior bore diameter;

first and second interior bore seal grooves, wherein the first interior bore seal groove is disposed between the first interior transition surface and the second interior bore seal groove, and wherein the second interior bore seal groove is disposed between the second interior transition surface and the first interior bore seal groove;

an aperture disposed in a portion of the female body, wherein the aperture is rearward of the front-most end of the female body and forward of the first interior bore seal groove, and wherein the aperture provides a passageway between an exterior of the female body and the first interior bore;

a first bore seal seated in the first interior bore seal groove;

a second bore seal seated in the second interior bore seal groove;

a stem comprising:

a stem head having a stem front face and a stem seal groove located rearward of the stem front face, wherein the stem head is configured to remain stationary relative to the front-most end of the female body, wherein the second interior bore seal groove and the stem seal groove open toward one another and at least partly overlap in a longitudinal direction, wherein the stem front face is positioned within the second interior bore, wherein the stem front face is positioned at a same or greater longitudinal distance from the front face as the first bore seal, and at a lesser longitudinal distance than the second interior transition surface, and wherein the stem front face is disposed to face toward the circular opening of the front-most end of the female body and to be perpendicular to a longitudinal axis of the second interior bore, the longitudinal axis of the second interior bore being located at a center of the second interior bore; and a stem seal seated in the stem seal groove;

a movable sleeve having a sleeve front face disposed to face toward the circular opening of the front-most end of the female body and configured to slide in a rearward direction relative to the stem head such that the stem seal is releasably engageable with an interior circumferential sleeve surface of the movable sleeve and the second bore seal is releasably engageable with an exterior circumferential sleeve surface of the movable sleeve, wherein the movable sleeve is spring biased toward a closed position in which the sleeve front face is aligned with the stem front face and in which the movable sleeve is configured to abut with the second interior transition surface of the female body and to engage with both the second bore seal and the stem seal, and wherein the movable sleeve is configured to slide in the rearward direction such that, as the female coupling device releasably receives a male coupling device into a fully-coupled position, the movable sleeve is configured to disengage from both the stem seal and the second bore seal; and the male coupling device comprising:

a male body comprising:

a front face at a front-most end of the male body;

a front opening in the front face of the male body;

an exterior circumferential surface extending rearward from the front face of the male body toward an outwardly ramped surface of an exterior circumferential shoulder such that the exterior circumferential shoulder is positioned rearward of the front face of the male body by a first axial length;

an exterior circumferential groove positioned rearwardly of the outwardly ramped surface of the exterior circumferential shoulder such that the exterior circumferential groove is at least partially defined by a first radial surface, a circumferential groove surface extending rearwardly from the first radial surface, and a rear transition surface extending rearwardly and outwardly from the circumferential groove surface;

a second radial surface positioned rearward of the exterior circumferential groove extending radially outward toward an outermost exterior surface of the male body; and an interior fluid passageway which has a first bore diameter extending rearward to an interior shoulder transitioning to a larger second bore diameter that extends rearward for a majority of an overall axial length of the male body;

a rear exterior connection end portion positioned rearwardly of the outermost exterior surface of the male body and extending rearwardly from a rear-facing radial surface such that the rear exterior connection end portion is configured to remain external to the female coupling device and couple with a fluid line; and a valve that is longitudinally slidable within the interior fluid passageway of the male body and configured to abut the interior shoulder so that a portion of the valve releasably seals the interior fluid passageway of the male body, the valve having a front-most valve face with a diameter greater than half a diameter of the exterior circumferential surface of male body, wherein the valve is biased by a valve spring to urge the valve toward a forward position in which the front-most valve face is aligned with the front face of the male body and the valve is entirely forward of the outwardly ramped surface of the exterior circumferential shoulder, wherein the valve is longitudinally slidable from the forward position to a rearward position in which the valve is located radially inward of the outwardly ramped surface of the exterior circumferential shoulder and the valve spring is positioned entirely rearward of the outwardly ramped surface of the exterior circumferential shoulder, wherein the exterior circumferential shoulder of the male body is positioned rearward of the front opening by the first axial length such that the valve of the male coupling device is configured to engage against the stem in the female coupling device while a maximum outer diameter of the exterior circumferential shoulder of the male body remains external to the female coupling device.

28. The coupling system according to claim 27, wherein the female coupling device further comprises a retainer, wherein a first portion of the retainer is configured to move through the aperture and into the first interior bore, wherein a bias spring is configured to urge the first portion of the retainer toward the first interior bore, and wherein the first portion of the retainer is further configured to contact a surface of the male coupling device to prevent the male coupling device from decoupling from the female coupling device when the female coupling device releasably receives the male coupling device in the fully-coupled position.

29. The coupling system according to claim 27, wherein the female coupling device further comprises a retaining clip, wherein a first portion of the retaining clip is configured to move through the aperture towards an interior of the first interior bore, wherein a second portion of the retaining clip is configured to engage with a bias spring configured to position the first portion of the retaining clip towards the interior of the first interior bore when the movable sleeve is in the closed position, and wherein the first portion of the retaining clip is further configured to contact a surface of the male coupling device to prevent the male coupling device from decoupling from the female coupling device when the female coupling device releasably receives the male coupling device in the fully-coupled position.

* * * * *